US011668198B2

(12) United States Patent
Jackson et al.

(10) Patent No.: US 11,668,198 B2
(45) Date of Patent: Jun. 6, 2023

(54) FIBER-REINFORCED SELF-HEALING ENVIRONMENTAL BARRIER COATING

(71) Applicant: United Technologies Corporation, Farmington, CT (US)

(72) Inventors: Richard Wesley Jackson, West Hartford, CT (US); John E. Holowczak, South Windsor, CT (US); Xia Tang, West Hartford, CT (US); James T. Beals, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1343 days.

(21) Appl. No.: 16/054,015

(22) Filed: Aug. 3, 2018

(65) Prior Publication Data
US 2020/0040746 A1 Feb. 6, 2020

(51) Int. Cl.
*F01D 5/28* (2006.01)
*C04B 35/622* (2006.01)
*C04B 35/628* (2006.01)

(52) U.S. Cl.
CPC ........ *F01D 5/288* (2013.01); *C04B 35/62222* (2013.01); *C04B 35/62847* (2013.01);
(Continued)

(58) Field of Classification Search
CPC ... F01D 5/288; F01D 5/282; C04B 35/62222; C04B 35/62847; C04B 35/62863;
(Continued)

(56) References Cited

U.S. PATENT DOCUMENTS 3,532,438 A * 10/1970 Palfreyman ............. F01D 5/282
416/198 A
5,113,582 A 5/1992 Monson et al.
(Continued)

FOREIGN PATENT DOCUMENTS

DE 102015205807 A1 10/2016
EP 1044944 A1 10/2000
(Continued)

OTHER PUBLICATIONS

European Search Report dated Dec. 6, 2019 issued for corresponding European Patent Application No. 19189903.8.
(Continued)

*Primary Examiner* — Topaz L. Elliott
(74) *Attorney, Agent, or Firm* — Bachman & LaPointe, P.C.

(57) ABSTRACT

An environmental barrier coating system for a turbine component, including an environmental barrier layer applied to a turbine component substrate containing silicon; the environmental barrier layer comprising an oxide matrix surrounding a fiber-reinforcement structure and a self-healing phase interspersed throughout the oxide matrix; wherein the fiber-reinforcement structure comprises at least one first fiber bundle oriented along a load bearing stress direction of said turbine component substrate; wherein the fiber-reinforcement structure comprises at least one second fiber bundle oriented orthogonal to the at least one first fiber bundle orientation; wherein the fiber-reinforcement structure comprises at least one third fiber woven between the at least one first fiber bundle and the at least one second fiber bundle.

16 Claims, 2 Drawing Sheets

(52) U.S. Cl.
CPC .. *C04B 35/62863* (2013.01); *C04B 35/62868* (2013.01); *C04B 35/62873* (2013.01); *F01D 5/282* (2013.01); *C04B 2235/3418* (2013.01); *C04B 2235/386* (2013.01); *C04B 2235/3826* (2013.01); *C04B 2235/422* (2013.01); *C04B 2235/5244* (2013.01); *C04B 2235/9669* (2013.01); *F05D 2220/32* (2013.01); *F05D 2240/12* (2013.01); *F05D 2240/30* (2013.01); *F05D 2300/222* (2013.01); *F05D 2300/6033* (2013.01); *F05D 2300/611* (2013.01)

(58) Field of Classification Search
CPC ...... C04B 35/62873; C04B 2235/3418; C04B 2235/3826; C04B 2235/386; C04B 2235/422; C04B 2235/5244; C04B 2235/9669; F05D 2220/32; F05D 2240/12; F05D 2240/30; F05D 2300/222; F05D 2300/6033; F05D 2300/611
See application file for complete search history.

(56) References Cited

U.S. PATENT DOCUMENTS

| | | |
|---|---|---|
| 5,580,837 A | 12/1996 | Dodds et al. |
| 5,858,181 A | 1/1999 | Jindal et al. |
| 6,117,560 A | 9/2000 | Maloney |
| 6,210,182 B1 | 4/2001 | Hasz et al. |
| 6,228,453 B1 | 5/2001 | Fareed et al. |
| 6,270,852 B1 | 8/2001 | Ulion et al. |
| 6,284,323 B1 | 9/2001 | Maloney |
| 6,296,941 B1 | 10/2001 | Eaton, Jr. et al. |
| 6,579,636 B2 | 6/2003 | Oguri et al. |
| 6,730,422 B2 | 5/2004 | Litton et al. |
| 6,924,040 B2 | 8/2005 | Maloney |
| 7,063,894 B2 | 6/2006 | Sun et al. |
| 7,226,672 B2 | 6/2007 | Litton et al. |
| 7,509,735 B2 | 3/2009 | Philip et al. |
| 7,513,955 B2 | 4/2009 | Kruger et al. |
| 7,622,195 B2 | 11/2009 | Schlichting et al. |
| 7,862,901 B2 | 1/2011 | Darolia et al. |
| 7,951,459 B2 | 5/2011 | Tang et al. |
| 7,972,657 B2 | 7/2011 | Schlichting et al. |
| 8,039,113 B2 | 10/2011 | Kirby et al. |
| 8,062,759 B2 | 11/2011 | Fu et al. |
| 8,084,086 B2 | 12/2011 | Hass et al. |
| 8,111,078 B1 | 2/2012 | Yang et al. |
| 8,119,247 B2 | 2/2012 | Kirby et al. |
| 8,216,689 B2 | 7/2012 | Witz et al. |
| 8,217,087 B1 | 7/2012 | Keller et al. |
| 8,257,559 B2 | 9/2012 | Floyd et al. |
| 8,273,470 B2 | 9/2012 | Kirby et al. |
| 8,287,635 B2 | 10/2012 | Luccarelli et al. |
| 8,343,589 B2 | 1/2013 | Kirby et al. |
| 8,357,454 B2 | 1/2013 | Kulkarni et al. |
| 8,470,460 B2 | 6/2013 | Lee |
| 8,512,874 B2 | 8/2013 | Darolia et al. |
| 8,529,999 B2 | 9/2013 | Maloney et al. |
| 8,574,721 B2 | 11/2013 | Gero et al. |
| 8,658,255 B2 | 2/2014 | Kirby et al. |
| 8,658,291 B2 | 2/2014 | Kirby et al. |
| 8,663,378 B2 | 3/2014 | Luccarelli et al. |
| 8,673,400 B2 | 3/2014 | Kirby et al. |
| 8,940,417 B2 | 1/2015 | Courcot et al. |
| 9,034,479 B2 | 5/2015 | Nagaraj et al. |
| 9,126,873 B2 | 9/2015 | Diss et al. |
| 9,387,512 B2 | 7/2016 | Lee et al. |
| 9,428,650 B2 | 8/2016 | Meschter et al. |
| 9,611,181 B2 | 4/2017 | Tang et al. |
| 9,713,912 B2 | 7/2017 | Lee |
| 9,771,811 B2 | 9/2017 | Zhang et al. |
| 9,926,238 B2 | 3/2018 | Louchet et al. |
| 9,938,839 B2 | 4/2018 | Rosenzweig et al. |
| 9,951,630 B2 | 4/2018 | Hass |
| 2006/0099358 A1 | 5/2006 | Raybould et al. |
| 2006/0110609 A1 | 5/2006 | Eaton et al. |
| 2006/0115659 A1 | 6/2006 | Hazel et al. |
| 2007/0292616 A1 | 12/2007 | Hazel |
| 2008/0113218 A1 | 5/2008 | Schlichting et al. |
| 2009/0155554 A1 | 6/2009 | Gentleman et al. |
| 2009/0186237 A1 | 7/2009 | Lee |
| 2010/0129636 A1 | 5/2010 | Cybulsky et al. |
| 2010/0129673 A1 | 5/2010 | Lee |
| 2010/0154422 A1 | 6/2010 | Kirby et al. |
| 2011/0014060 A1 | 1/2011 | Bolcavage et al. |
| 2011/0217560 A1 | 9/2011 | Ridgeway |
| 2011/0281107 A1 | 11/2011 | Gero et al. |
| 2012/0244383 A1 | 9/2012 | Meschter et al. |
| 2013/0122259 A1 | 5/2013 | Lee |
| 2013/0210299 A1* | 8/2013 | Zhang ................... C23C 28/345 156/280 |
| 2013/0260130 A1 | 10/2013 | Taxacher et al. |
| 2014/0065408 A1 | 3/2014 | Strock et al. |
| 2014/0271208 A1* | 9/2014 | Garcia-Crespo ...... F01D 5/3007 156/60 |
| 2014/0272310 A1 | 9/2014 | Lazur et al. |
| 2015/0111063 A1 | 4/2015 | Khan et al. |
| 2015/0118444 A1 | 4/2015 | Lipkin et al. |
| 2015/0167141 A1 | 6/2015 | Rozenweig et al. |
| 2015/0308276 A1 | 10/2015 | Kleinow et al. |
| 2016/0130188 A1* | 5/2016 | Louchet ............... C04B 41/5027 428/448 |
| 2016/0160664 A1 | 6/2016 | Luthra et al. |
| 2016/0186580 A1 | 6/2016 | Zaleski et al. |
| 2016/0214907 A1 | 7/2016 | Shim et al. |
| 2016/0332922 A1 | 11/2016 | Tang et al. |
| 2017/0022113 A1 | 1/2017 | Opila |
| 2017/0073278 A1 | 3/2017 | Landwehr et al. |
| 2017/0121232 A1 | 5/2017 | Nelson et al. |
| 2017/0145560 A1 | 5/2017 | Weaver et al. |
| 2017/0217842 A1* | 8/2017 | Sato ........................ B32B 5/10 |
| 2017/0335118 A1 | 11/2017 | Tang et al. |
| 2017/0342539 A1 | 11/2017 | Sato et al. |
| 2018/0170811 A1 | 6/2018 | Osada et al. |
| 2018/0305821 A1 | 10/2018 | Wan et al. |
| 2018/0347049 A1 | 12/2018 | Oboodi et al. |
| 2018/0370862 A1 | 12/2018 | Kirby et al. |
| 2019/0084890 A1* | 3/2019 | Weaver ................... F01D 5/284 |
| 2020/0040746 A1 | 2/2020 | Jackson et al. |
| 2020/0055788 A1 | 2/2020 | Mikalsen et al. |
| 2020/0080430 A1 | 3/2020 | Schmidt et al. |
| 2020/0123071 A1 | 4/2020 | Ndamka et al. |
| 2020/0331817 A1* | 10/2020 | Bianchi ................. C23C 28/042 |
| 2022/0048828 A1 | 2/2022 | Liu et al. |

FOREIGN PATENT DOCUMENTS

| | | |
|---|---|---|
| EP | 1806431 A2 | 7/2007 |
| EP | 1900848 A2 | 3/2008 |
| EP | 2189504 A1 | 5/2010 |
| EP | 2192098 A2 | 6/2010 |
| EP | 2388354 A1 | 11/2011 |
| EP | 2615250 A1 | 7/2013 |
| EP | 2644747 A1 | 10/2013 |
| EP | 3130577 A1 | 2/2017 |
| EP | 3162783 A1 | 5/2017 |
| EP | 3409653 A1 | 12/2018 |
| EP | 3954806 A1 | 2/2022 |
| WO | 2013103425 A2 | 7/2013 |
| WO | 2014204480 A1 | 12/2014 |
| WO | 2017031163 A1 | 2/2017 |
| WO | 2019069023 A1 | 4/2019 |

OTHER PUBLICATIONS

European Search Report dated Jan. 13, 2020 issued for corresponding European Patent Application No. 19192162.6.
European Search Report dated Jan. 7, 2020 issued for corresponding European Patent Application No. 19192131.1.
European Search Report dated Jan. 3, 2020 issued for corresponding European Patent Application No. 19192124.6.

(56) References Cited

OTHER PUBLICATIONS

Poerschke, David L. et al: "Interaction of yttrium disilicate environment barrier coatings with calcium-magnesium-iron aluminosilicate melts", Acta Materalia., vol. 145, Dec. 19, 2017, pp. 451-461.

Ahlborg, Nadia L., et al.: "Calcium-magnesium aluminosilicate (CMAS) reactions and degradation mechanisms of advanced environmental barrier coatings", Surface and Coatings Technology, vol. 237, 2013, pp. 79-87.

Zhao, Hengbei et al: "Molten silicate reactions with plasma sprayed ytterbium silicate coatings", Surace and Coatings Technology, vol. 288, Jan. 14, 2016, pp. 151-162.

Nikas, V. et al..(2015) Strong visible light emission from silicon-oxycarbide nanowire arrays prepared by electron beam lithography and reactive ion etching. Journal of Materials Research. 30. 1-8. (Year 2015).

U.S. Office Action dated Mar. 14, 2022 issued for corresponding U.S. Appl. No. 15/998,730.

U.S. Office Action dated Mar. 16, 2022 issued for corresponding U.S. Appl. No. 15/998,731.

U.S. Non-Final Office Action dated Mar. 11, 2020 for corresponding U.S. Appl. No. 15/998,736.

U.S. Non-final Office action dated Sep. 10, 2020 issued for corresponding U.S. Appl. No. 14/711,902.

U.S. Notice of Allowance dated Nov. 2, 2010 issued for corresponding U.S. Appl. No. 15/998,736.

U. Kolitsch, H.J. Seifert, and F. Aldinger, "Phase Relationships in the Systems $RE_2O_3$-$Al_2O_3$-$SiO_2$ (RE = Rare Earth Element , Y, and Sc)" Journal of Phase Equilibria, vol. 19, No. 5, 1998.

European Office action dated Mar. 7, 2018 issued for corresponding EP Patent Application No. 15168227.5.

Latka, et al. "Thermal diffusivity and conductivity of yttria stabilized zirconia coatings obtained by suspension plasma spraying", Surface & Coatings Technology 208 (2012), pp. 87-91, (Year 2012).

Fauchals, et al. "Understanding of Suspension DC Plasma Spraying of Finely Structured Coatings for SOFC", IEEE Transactions on Plasma Science, vol. 33, No. 2, Apr. 2005, pp. 920-930. (Year: 2005).

Qu, et al., "Thermal Conductivity of the gadolinium calcium silicate apatites: Effect of Different Point Defect Types", Acta Materialia vol. 59, (2011), pp. 3841-3850.

U.S. Non-final Office action dated Apr. 13, 2017 issued for corresponding U.S. Appl. No. 14/711,902.

U.S. Non-final Office action dated Aug. 1, 2019 issued for corresponding U.S. Appl. No. 14/711,902.

U.S. Final Office action dated Aug. 23, 2017 issued for corresponding U.S. Appl. No. 14/711,902.

U.S. Final Office action dated Dec. 11, 2019 issued for corresponding U.S. Appl. No. 14/711,902.

EP Search Report dated Sep. 28, 2015 issued for European Patent Application No. 15168227.5.

U.S. Non-Final Office Action dated Jul. 17, 2019 issued in U.S. Appl. No. 15/998,736.

U.S. Final Office Action dated Oct. 31, 2019 issued in U.S. Appl. No. 15/998,736.

\* cited by examiner

FIBER-REINFORCED SELF-HEALING ENVIRONMENTAL BARRIER COATING

BACKGROUND

The disclosure relates to an article comprising a substrate containing silicon and an environmental barrier coating (EBC) which functions as a protective environmental barrier coating and inhibits the formation of gaseous species of Si, particularly $Si(OH)_x$ when the article is exposed to a high temperature, steam-laden environment.

Ceramic materials containing silicon and metal alloys containing silicon have been proposed for structures used in high temperature applications as, for example, gas turbine engines, heat exchangers, internal combustion engines, and the like. A particularly useful application for these materials is for service in gas turbine engines which operate at high temperatures in steam-laden environments. The ceramic materials that operate within the gas turbine are exposed to an environment in which jet fuel is combusted. As a result of the combustion, the temperature is high and steam (vapor phase water) and oxygen are present.

It has been found that these silicon containing substrates can recede and lose mass as a result of a formation of volatile Si species, particularly $Si(OH)_x$ and SiO when exposed to high temperature, steam laden environments. For example, silicon carbide when exposed to a lean fuel environment of approximately 1 ATM pressure of water vapor at 1200° C. will exhibit weight loss and recession at a rate of approximately 6 mils per 1000 hrs.

It is believed that the process involves oxidation of the silicon carbide to form silica on the surface of the silicon carbide followed by reaction of the silica with steam to form volatile species of silicon such as $Si(OH)_x$. Naturally it would be highly desirable to provide an external barrier coating for silicon containing substrates which would inhibit the formation of volatile silicon species, $Si(OH)_x$ and SiO, and thereby reduce recession and mass loss.

SUMMARY

In accordance with the present disclosure, there is provided an environmental barrier coating, comprising an environmental barrier layer applied to a substrate containing silicon; the environmental barrier layer comprising an oxide matrix surrounding a fiber-reinforcement structure and a self-healing phase interspersed throughout the oxide matrix.

In another and alternative embodiment, the substrate comprises a ceramic matrix composite (CMC) material.

In another and alternative embodiment, the fiber-reinforcement structure comprises a continuous weave of fibers.

In another and alternative embodiment, the fiber-reinforcement structure comprises a SiC material composition.

In another and alternative embodiment, the fiber-reinforcement structure comprises at least one first fiber bundle oriented along a load bearing stress direction of the substrate.

In another and alternative embodiment, the substrate comprises a turbine blade, and the load bearing stress direction is oriented along a root to tip direction.

In another and alternative embodiment, the substrate comprises at least one of a turbine vane and a turbine blade, and the load bearing stress direction is oriented along the contour of a platform fillet.

In another and alternative embodiment, the fiber-reinforcement structure comprises at least one second fiber bundle oriented orthogonal to the first fiber bundle orientation.

In another and alternative embodiment, the fiber-reinforcement structure comprises at least one third fiber woven between the first fiber bundle and the second fiber bundle.

In another and alternative embodiment, the fiber-reinforcement structure comprises fibers that are oxygen getter loading materials.

In another and alternative embodiment, the fiber-reinforcement structure comprises fibers that are coated with an interface coating.

In another and alternative embodiment, the interface coating is selected from the group consisting of boron nitride, silicon carbide, an oxide and carbon.

In another and alternative embodiment, the matrix comprises a multi-phase mixture.

In another and alternative embodiment, the multi-phase mixture comprises $SiO_2$.

In another and alternative embodiment, the self-healing phase comprises a glass phase.

In another and alternative embodiment, the self-healing phase comprises a material having properties of being in thermodynamic equilibrium with $SiO_2$ during operation at predetermined temperatures.

In another and alternative embodiment, the self-healing phase comprises a material having properties of flowing into cracks formed in the matrix during operation at predetermined temperatures of between 1000° C. and 2000° C.

In another and alternative embodiment, the environmental barrier coating further comprises an oxygen getter phase interspersed throughout the matrix.

In another and alternative embodiment, the environmental barrier coating further comprises a protective layer applied on the environmental barrier coating.

The disclosure relates to a continuous fiber-reinforced, self-healing environmental barrier coating that prevents the ingress of oxygen and steam. The disclosed coating can increase durability with respect to conventional coatings. This coating consists of an oxide matrix and continuous fibers in a woven structure. The oxide matrix is a multi-phase mixture consisting of at least a $SiO_2$ rich phase and a glass phase. In alternative embodiments, the oxide matrix can be a single phase material that may not include a self-healing functionality. The composition of the glass phase is chosen to be in thermodynamic equilibrium with $SiO_2$ and to be sufficiently fluid at high temperatures to flow into cracks in the coating, which imparts 'self-healing functionality.' The fibers could be SiC, in some instances coated with an interface coating, such as boron nitride or silicon carbide, oxide (e.g. Nextel™ 720) or carbon.

Other details of the coating are set forth in the following detailed description and the accompanying drawings wherein like reference numerals depict like elements.

DETAILED DESCRIPTION

Figure 1:
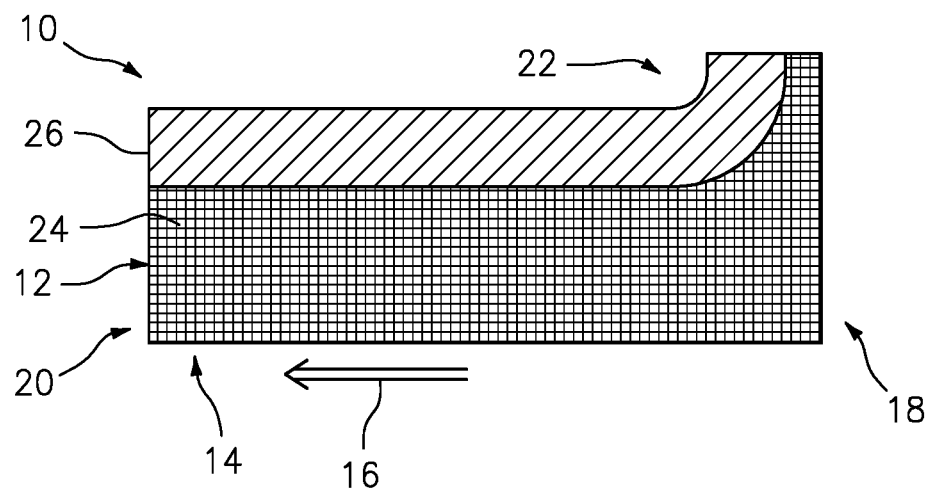
FIG. 1 is a cross section of an exemplary coating on a substrate containing silicon according to the disclosure.

Referring now to FIG. 1, there is illustrated an environmental barrier coating 10 formed over a substrate 12 of an article 14, configured to inhibit the formation of gaseous species of silicon when the article 14 is exposed to a high temperature, steam-laden environment. The coating 10 can be designed for maximum protection between 1100° C. and 1700° C. The substrate 12 can be associated with articles 14 such as, at least one of a turbine vane and a turbine blade, and particularly a gas turbine engine component, such as components in the hot section of the gas turbine engine, including rotating components and portions of combustors, shrouds, and the like.

The substrate 12 of the article 14 can include portions that experience certain forces that result in a load bearing stress often oriented in a particular direction, i.e., a load bearing stress direction 16 of the substrate 12 of the article 14, illustrated as an arrow 16. It is contemplated that the load bearing stress direction 16 can be oriented in a variety of directions as well as multiple directions depending on the design of the substrate 12 and service of the article 14 in the gas turbine engine.

Figure 3:
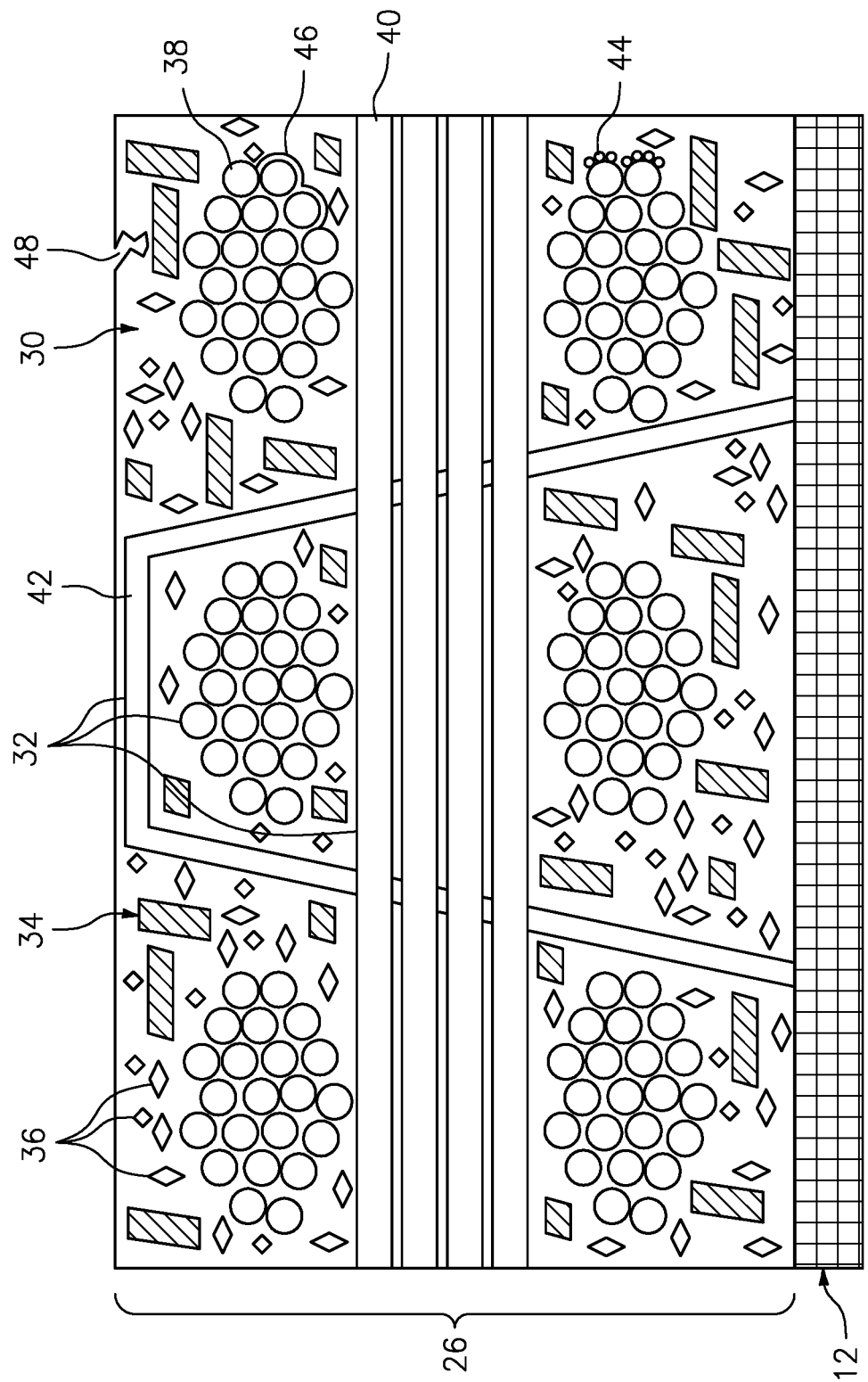
FIG. 3 is cross section of the exemplary coating on a substrate containing silicon according to the disclosure.

In an exemplary embodiment the load bearing stress direction 16 can be oriented from a root 18 of the article 14 to a tip 20 of the article 14, such as a blade root to a blade tip. In another exemplary embodiment, the load bearing stress direction 16 can be oriented along a contour of a fillet between a platform and an airfoil portion of the article 14, such as a blade/vane platform fillet 22. As illustrated in FIG. 3, the root to tip direction can be understood as orthogonal to the plane of the page shown in the bundle of fibers 38.

The substrate 12 can be constructed from materials containing silicon and can be a ceramic matrix composite material, a silicon ceramic substrate or a silicon containing metal alloy. In an exemplary embodiment, the substrate 12 can be silicon containing ceramic material such as, for example, silicon carbide, silicon nitride, silicon oxy-nitride and silicon aluminum oxy-nitride. In accordance with a particular embodiment, the silicon containing ceramic substrate comprises a silicon containing matrix with reinforcing materials 24 such as fibers, particles and the like and, more particularly, a silicon based matrix which is fiber-reinforced. Particularly suitable ceramic substrates are a silicon carbide coated silicon carbide fiber-reinforced silicon carbide particle and silicon matrix, a carbon fiber-reinforced silicon carbide matrix and a silicon carbide fiber-reinforced silicon nitride matrix. Particularly useful silicon-metal alloys for use as substrates for the article 14 can include molybdenum-silicon alloys, niobium-silicon alloys, iron-silicon alloys, and aluminum-silicon alloys.

Figure 2:
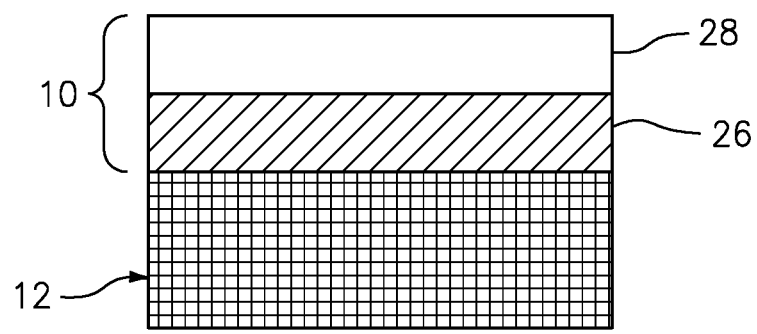
FIG. 2 is a cross section of an exemplary coating on a substrate containing silicon according to the disclosure.

Referring also to FIG. 2 and FIG. 3, an environmental barrier layer 26 can be applied to the substrate 12. A protective layer 28 can be applied on the environmental barrier layer 26. The protective layer 28 is configured to resist vaporization when exposed to steam. In an exemplary embodiment, the protective layer can be a rare earth disilicate, such as $Y_2Si_2O_7$, $Yb_2Si_2O_7$; a rare earth monosilicate, such as $Y_2SiO_5$, $Yb_2SiO_5$, $HfSiO_4$, $ZrSiO_4$, $HfO_2$, BSAS ($Ba_xSr_{1-x}Al_2Si_2O_8$ where x may be 0.25).

The environmental barrier layer 26 can include an oxide matrix 30 surrounding a fiber-reinforcement structure 32 and a self-healing phase 34 interspersed throughout the oxide matrix 30. In an alternative embodiment, the oxide matrix 30 can be a single phase without self-healing phase present. In another embodiment, the oxide matrix 30 can include a multi-phase mixture, such as $SiO_2$ rich phase. The self-healing phase 34 can include a glass phase. The self-healing phase 34 can include a material having properties that are in thermodynamic equilibrium with $SiO_2$ during operation at predetermined temperatures. The self-healing phase 34 comprises a material having properties of flowing into cracks 48 formed in the matrix 30 during operation at those predetermined temperatures. The self-healing phase 34 can be sufficiently fluid at high temperatures to flow into cracks 48 in the coating 10, which imparts a self-healing functionality. Between 1000° C. and 2000° C. these materials can exist as mixtures of solid and liquid phases. The temperature at which liquid formation occurs can be controlled by the chemical composition. In an exemplary embodiment, liquid formation initiates between 1150° C. and 1500° C., with the volume fraction of liquid increasing with temperature. The viscosity of the liquid phase can vary from 0.1 to 100,000 Pa*s with the exemplary viscosity varying between 10-10,000 Pa*s. An example of the self-healing phase 34 can include a mixture of $BaMg_2Al_6Si_9O_{30}$ and $SiO_2$. Another example can include the mixture of $CaAl_2Si_2O_8$, $CaSiO_3$ and $SiO_2$. Another example includes the mixture of $Y_2Si_2O_7$, $Al_2O_3$ and $SiO_2$. Alternatively, the materials listed above could be premixed and processed to form a glass. The initial composition of the glass could be: 2% BaO, 3% MgO, 10% $AlO_{1.5}$, 85% $SiO_2$, or 8% CaO, 17% $AlO_{1.5}$ 75% $SiO_2$, or 10% $YO_{1.5}$, 10 $AlO_{1.5}$, 80% $SiO_2$.

An oxygen getter phase 36 can also be interspersed throughout the oxide matrix 30. The oxygen getter phase 36 can comprise an oxy-carbide material. In an exemplary embodiment, the oxy-carbide material can include a glass that contains oxygen and carbon and silicon dioxide as well as particles of amorphous carbon and silicon carbide.

The fiber-reinforcement structure 32 can include a continuous weave of fibers. In an exemplary embodiment, the fiber-reinforcement structure 32 comprises a SiC material composition. The fiber-reinforcement structure 32 can include at least one first fiber bundle 38 oriented along the load bearing stress direction 16 of the substrate 12. In an exemplary embodiment, the first fiber bundle 38 can be oriented from blade root 18 to blade tip 20 and aligned along the root to tip direction, so as to provide structural support along the same orientation as the load bearing stress direction 16. In another exemplary embodiment, the first fiber bundle 38 can be oriented along the load bearing stress direction 16 oriented along the contour of the blade/vane platform fillet 22.

In another exemplary embodiment, the fiber-reinforcement structure 32 comprises at least one second fiber bundle 40 oriented orthogonal to the first fiber bundle 38 orientation. In another exemplary embodiment, the fiber-reinforcement structure 32 comprises at least one third fiber 42 woven between the first fiber bundle 38 and the second fiber bundle 40. In an exemplary embodiment, the fiber-reinforcement structure 32 comprises fibers that comprise oxygen getter materials 44. In another exemplary embodiment, the fiber-reinforcement structure 32 comprises fibers that are coated with an interface coating 46. The interface coating 46 can include materials selected from the group consisting of boron nitride, silicon carbide, an oxide and carbon.

The environmental barrier layer 26 can be present on the article at a thickness of greater than or equal to about 0.5 mils (0.0005 inch), preferably between about 3 to about 30 mils and ideally between about 3 to about 8 mils.

The environmental barrier layer 26 can be applied by preparing the substrate 12 surface.

There are several methods that could be used to introduce a glass-ceramic into the fiber reinforcement structure 32 being provided for the environmental barrier coating 10. In one approach, a fiber preform can be infiltrated using a glass particulate suspension, which would be added to the fiber preform layer by soaking, spraying or other means, at ambient temperature. The infiltrated fabric or preform is placed adjacent to the silicon containing CMC substrate 12, and the assembly is heated. Pressure can be applied using graphite dies, powdered media such as carbon or boron nitride, and the like, in order to de-gas the environmental barrier layer 26 at temperatures suitable for melting the glass. The subsequent assembly can undergo annealing to obtain a desired microstructure.

In another exemplary embodiment, an alternate technique of assembly would be to place a fiber preform in contact with the silicon containing CMC substrate 12. The fiber perform can then be rigidized using a variety of techniques, including but not limited to adding a ceramic sol and freezing the substrate followed by freeze drying. The assembly is then placed into a graphite die which comprises an outer profile of the EBC coated article 14. Molten glass is then injected into the die and flows into and among the fibers of the preform. The assembly can then be cooled and (re)heated to a temperature suitable to promote the formation of the desired microstructure.

Alternative approaches to introducing oxide or silicate phases into a relatively thin fiber preform, can include but are not limited to spraying the preform with a suspension, followed by heating the surface via flame or plasma spraying molten oxide and/or silicate materials onto the preform, and the like. Generally, sharp temperature gradients between the substrate and the created layer should be avoided to enhance adherence.

A self-healing, fiber-reinforced oxidant barrier offers a robust mechanism for protecting load bearing materials in the hot-section of gas turbine engines. This disclosure describes the use of fiber reinforcements in the environmental barrier coating to increase durability. Additionally, the self-healing, multi-phase matrix that surrounds the fibers inhibits the permeability of oxidants through the coating. The fibers will also increase the creep resistance of the coating, enhancing durability on rotating components.

An environmental barrier coating prevents CMC recession caused by Si(OH)x formation. Interaction of the environmental barrier coating with the steam laden combustion environment results in the formation of Si(OH)x, but the rate of formation is much less than that of an uncoated SiC CMC.

There has been provided a coating. While the coating has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An environmental barrier coating system for a turbine component, comprising:
    an environmental barrier layer applied to a turbine component substrate containing silicon; said environmental barrier layer comprising an oxide matrix surrounding a fiber-reinforcement structure and a self-healing phase interspersed throughout said oxide matrix; wherein said fiber-reinforcement structure comprises at least one first fiber bundle oriented along a load bearing stress direction of said turbine component substrate; wherein said fiber-reinforcement structure comprises at least one second fiber bundle oriented orthogonal to said at least one first fiber bundle orientation; wherein said fiber-reinforcement structure comprises at least one third fiber woven between said at least one first fiber bundle and said at least one second fiber bundle.

2. The environmental barrier coating of claim 1, wherein said turbine component substrate comprises a ceramic matrix composite material.

3. The environmental barrier coating of claim 1, wherein said fiber-reinforcement structure comprises a continuous weave of fibers.

4. The environmental barrier coating of claim 1, wherein said fiber-reinforcement structure comprises a SiC material composition.

5. The environmental barrier coating of claim 1, wherein said turbine component substrate comprises a turbine blade, and said load bearing stress direction is oriented along a root to tip direction.

6. The environmental barrier coating of claim 1, wherein said turbine component substrate comprises at least one of a turbine vane and a turbine blade, and said load bearing stress direction is oriented along a contour of a platform fillet.

7. The environmental barrier coating of claim 1, wherein said fiber-reinforcement structure comprises fibers that are oxygen getter materials.

8. The environmental barrier coating of claim 1, wherein said fiber-reinforcement structure comprises fibers that are coated with an interface coating.

9. The environmental barrier coating of claim 8, wherein said interface coating is selected from the group consisting of boron nitride, silicon carbide, an oxide, and carbon.

10. The environmental barrier coating of claim 1, wherein said matrix comprises a multi-phase mixture.

11. The environmental barrier coating of claim 10, wherein said multi-phase mixture comprises $SiO_2$.

12. The environmental barrier coating of claim 1, wherein said self-healing phase comprises a glass phase.

13. The environmental barrier coating of claim 1, wherein said self-healing phase comprises a material having properties of being in thermodynamic equilibrium with $SiO_2$ during operation at predetermined temperatures.

14. The environmental barrier coating of claim 1, wherein said self-healing phase comprises a material having properties of flowing into cracks formed in said matrix during operation at predetermined temperatures.

15. The environmental barrier coating of claim 1, further comprising an oxygen getter phase interspersed throughout said matrix.

16. The environmental barrier coating of claim 1, further comprising:
    a protective layer applied on said environmental barrier coating.

* * * * *